United States Patent [19]
Kelley

[11] Patent Number: 5,527,498
[45] Date of Patent: Jun. 18, 1996

[54] METHOD FOR PRODUCTION OF HIGH DENSITY AMMONIUM NITRATE PRILLS

[75] Inventor: David A. Kelley, Baton Rouge, La.

[73] Assignee: Arcadian Fertilizer, L.P., Memphis, Tenn.

[21] Appl. No.: 483,936

[22] Filed: Jun. 7, 1995

Related U.S. Application Data

[63] Continuation-in-part of Ser. No. 306,824, Sep. 15, 1994, Pat. No. 5,486,246.

[51] Int. Cl.$^6$ .................................................. C06B 21/00
[52] U.S. Cl. .......................................... 264/3.4; 149/109.6
[58] Field of Search .......................... 149/109.6; 264/3.4; 71/61, 64.02, 64.13

[56] References Cited

U.S. PATENT DOCUMENTS

| | | | |
|---|---|---|---|
| 312,010 | 2/1885 | Penniman . | |
| 1,613,334 | 1/1927 | Symmes . | |
| 2,353,147 | 7/1944 | Cook et al. | 52/11 |
| 2,616,786 | 11/1952 | Whetstone | 23/103 |
| 2,903,969 | 9/1959 | Kolbe | 102/23 |
| 3,116,185 | 12/1963 | Wilson et al. | 149/7 |
| 3,160,536 | 12/1964 | Aitchison | 149/8 |
| 3,171,716 | 3/1965 | Dickmann et al. | 23/103 |
| 3,190,774 | 6/1965 | Wilson | 149/7 |
| 3,212,944 | 10/1965 | Lyon et al. | 149/21 |
| 3,266,960 | 8/1966 | Lyon et al. | 149/21 |
| 3,303,073 | 2/1967 | Graham et al. | 149/41 |
| 3,317,276 | 5/1967 | Brown et al. | 23/103 |
| 3,640,697 | 2/1972 | Toops, Jr. | 71/27 |
| 3,834,955 | 9/1974 | Fox et al. | 149/7 |
| 4,111,727 | 9/1978 | Clay | 149/2 |
| 4,294,633 | 10/1981 | Clay | 149/2 |
| 4,401,490 | 8/1983 | Alexander et al. | 149/2 |
| 4,555,278 | 11/1985 | Cescon et al. | 149/21 |
| 4,615,751 | 10/1986 | Smith et al. | 149/2 |
| 4,717,555 | 1/1988 | Newman et al. | 423/268 |
| 4,749,349 | 6/1988 | Thuring et al. | 425/222 |
| 4,772,308 | 9/1988 | Zurimendi et al. | 71/64.12 |
| 4,828,633 | 5/1989 | Forsberg | 149/2 |
| 5,034,071 | 7/1991 | VanOmmeren | 149/7 |
| 5,078,813 | 1/1992 | Tucker et al. | 149/7 |

OTHER PUBLICATIONS

MSDS from Lobeco Products, Feb. 12, 1991.
Lobeco Products Literature, "Coating Agent for Ammonium Nitrate Fertilizers" 1992.
Fordham, *High Explosives and Propellants*, 1966, pp. 35–36.

*Primary Examiner*—Donald P. Walsh
*Assistant Examiner*—Anthony R. Chi
*Attorney, Agent, or Firm*—Luedeka, Neely & Graham

[57] ABSTRACT

The specification discloses a method for making a high density prill particularly useful in making an emulsion explosive composition. The method comprises incorporating certain sulfonate additives during the prilling process in order to make a porous ammonium nitrate matrix having a density of at least about 54 pounds per cubic foot (0.86 kg/L) and a concentration of greater than about 99.5 wt. % ammonium nitrate which exhibits a high oil absorption capacity.

14 Claims, 5 Drawing Sheets

METHOD FOR PRODUCTION OF HIGH DENSITY AMMONIUM NITRATE PRILLS

This application is a continuation-in-part of U.S. application Ser. No. 08/306,824, filed on Sep. 15, 1994, now U.S. Pat. No. 5,486,246.

FIELD OF THE INVENTION

The present invention relates to storage stable, high density ammonium nitrate prills useful in fertilizer and explosives compositions.

BACKGROUND

Ammonium nitrate is used for a variety of applications, particularly for fertilizer compositions and explosive compositions. Selection of ammonium nitrate for either explosive compositions or fertilizer compositions is based on the characteristics and properties of the ammonium nitrate. Typically, the ammonium nitrate used for fertilizer and explosive compositions is in solid or granular form, often referred to as "prills", and the properties and characteristics exhibited by the solid ammonium nitrate are a function of the particular manufacturing process as well as any additives used during the manufacturing process.

Depending on the manufacturing process and particular additives used, the resulting ammonium nitrate prill may be classified as high density or low density. Conventionally, an ammonium nitrate prill with a bulk density of 54 pounds per cubic foot (0.865 kg/L) or more is considered high density prill. Ammonium nitrate prill with a bulk density of less than 54 pounds per cubic foot is considered low density prill, although low density ammonium nitrate will generally have a bulk density no higher than about 51 pounds per cubic foot (0.82 kg/L).

Low density prills are obtained by prilling in a prilling tower wherein liquid droplets are converted to the solid prill form by cooling a relatively dilute aqueous solution of ammonium nitrate. As a result of water evaporation during the cooling/solidification process, low density ammonium nitrate prills contain voids which increase their oil absorbance capacity. Heretofore, low density ammonium nitrate prills have been the principal form of ammonium nitrate for preparing explosives because the voids permit liquid hydrocarbon fuel to penetrate and become intimately associated with the ammonium nitrate.

In contrast to low density prills, high density ammonium nitrate prills are formed from highly concentrated molten ammonium nitrate. High density prills have not found widespread use in explosive compositions because they generally exhibit little or no oil absorptivity. Accordingly, use of high density ammonium nitrate prills have been limited primarily to fertilizer compositions.

An improved process for forming low density ammonium nitrate prills is disclosed in U.S. Pat. No. 4,749,349 to Thuring et al. These low density prills are typically used in water-in-oil emulsions in combination with fuel, water, emulsifiers, density reducing agents, and the like. However, in order to form useful explosive compositions with fuel or oil, these low density ammonium nitrate prills must contain additives which are compatible with water-in-oil emulsifiers. U.S. Pat. No. 5,034,071 to VanOmmeren discloses several additives for use with the low density ammonium nitrate prills made by the Thuring et al. process. Low density prill containing these additives is said to be useful for forming explosive compositions due to the compatibility between the external additive and the emulsifier in the oil/water composition. However, the preferred external additives of VanOmmeren tend to increase the blocking of the prills in rail cars and trucks, thereby increasing the difficulty in unloading the prills.

Handling of ammonium nitrate in powder, crystalline, or granular form has been a problem for some time not only due to the explosive nature of ammonium nitrate but also due to its tendency to undergo volume changes during storage. These volume changes are due in part to the hygroscopicity of the ammonium nitrate granules. Accordingly, many additives have been developed for ammonium nitrate prills in an attempt to improve their storage and handling characteristics. U.S. Pat. No. 3,171,716 to Diekmann et al. discloses the use of a mixture of ammonium nitrate and 0.25 to 3 wt. % sodium ions, phosphate ions and magnesium ions in the form of salts to increase the density of the ammonium nitrate and to lower its hygroscopicity.

Not only does the absorption of water increase the volume of stored ammonium nitrate, but it also causes the ammonium nitrate to become sticky on standing and form hard masses during storage. U.S. Pat. No. 3,190,774 to Wilson discloses the use of an external coating of an admixture of alkali metal salt of alkylaryl sulfonic acid and a major amount of silica-alumina for reducing the caking tendencies of ammonium nitrate during storage.

Accordingly, there is a need for a high density ammonium nitrate prill which has a sufficient oil absorption capacity so as to be useful in explosive compositions, and which exhibits good handling and storage properties.

An object of the present invention, therefore, is to provide an improved high density ammonium nitrate prill.

Another object of the invention is to provide a process for the formation of high density ammonium nitrate prills useful in explosive compositions.

Still another object of the invention is to provide a high density ammonium nitrate prill containing internal and external additives which dramatically increase the oil absorbing capacity of the prill without adversely affecting other properties of the prill, and a related process for making the same.

Yet another object of the invention is to provide a relatively simple, economical process for making an oil-absorbent high density prill useful in explosive compositions.

SUMMARY OF THE INVENTION

With regard to the foregoing objects, the present invention provides a high density ammonium nitrate prill useful in explosive compositions and, explosive compositions containing the high density prill. The prill comprises a porous ammonium nitrate matrix having a density of at least about 54 pounds per cubic foot (0.86 kg/L), preferably about 56 to about 59 pounds per cubic feet (about 0.9 kg/L to about 0.95 kg/L), and a concentration of greater than about 99.5 wt. % ammonium nitrate. In order to increase the oil absorption capacity of the ammonium nitrate, the prill contains as an internal additive an aqueous surfactant, preferably an aqueous alkylaryl sulfonate, and as an external coating a non-aqueous surfactant, preferably a non-aqueous anionic alkylaryl sulfonate. The prill exhibits an oil absorption capacity of at least about 4 wt. % based on the total weight of ammonium nitrate and oil.

It will be appreciated that heretofore, commercially available high density prill exhibited minimal oil absorption, and its use was therefore limited primarily to fertilizer applications. The invention dramatically improves the oil absorption of high density prill so that its usefulness is expanded to explosive compositions.

Furthermore, the oil-absorptive high density prill of the invention absorbs substantially more oil on a volume basis for a given weight percentage absorption than low density prill. For example, one cubic foot of a 60 lb/ft³ prill with an 8 wt. % oil absorption picks up 4.8 lbs. of oil. The same volume of 50 lb/ft³ ammonium nitrate prill picks up only 4 lbs of oil, 20 wt. % less. It is apparent that the high density prill will produce greater explosive force due to the larger amount of oil absorbed per unit volume.

The invention also provides a method for forming a high density ammonium nitrate prill which exhibits an oil absorption capacity of greater than about 4 wt. %. The process comprises evaporating water from an ammonium nitrate solution to obtain an ammonium nitrate concentrate containing less than 0.5 wt. % water and at least about 99.5 wt. % ammonium nitrate. To the ammonium nitrate concentrate is added from about 500 to about 600 ppm of an aqueous naphthalene sulfonate to form an ammonium nitrate mixture.

Droplets of the ammonium nitrate mixture are formed in a prilling tower by feeding concentrated ammonium nitrate to a prill forming apparatus, such as a rotating foraminous prilling bucket, in an upper section of the prilling tower. As the prilling bucket spins, the droplets thus formed exiting the prilling bucket are cooled as they descend through the prilling tower in countercurrent flow with a cooling gas such as air, and undergo solidification. Preferably, the prill is cooled to a temperature below about 215° F. and most preferably to a temperature in the range of from about 195° C. to about 215° F. It is believed that optimal oil absorbance capacity of the high density ammonium nitrate prills may be achieved by maintaining the temperature of the concentrated ammonium nitrate feed to the prilling bucket within the range of from about 340° to about 360° F. (about 171° to about 182° C.). The resulting prill is essentially pure ammonium nitrate, e.g., greater than 99.5 wt. % ammonium nitrate, preferably greater than about 99.7 wt. %. Because the resulting prill already has a high concentration of ammonium nitrate with very little water, additional drying of the formed prill is not necessary.

BRIEF DESCRIPTION OF THE DRAWINGS

The above and other features and advantages of the invention will be described in further detail in the following detailed description of a preferred embodiment in conjunction with the accompanying drawings in which.

DETAILED DESCRIPTION OF THE INVENTION

Figure 1:
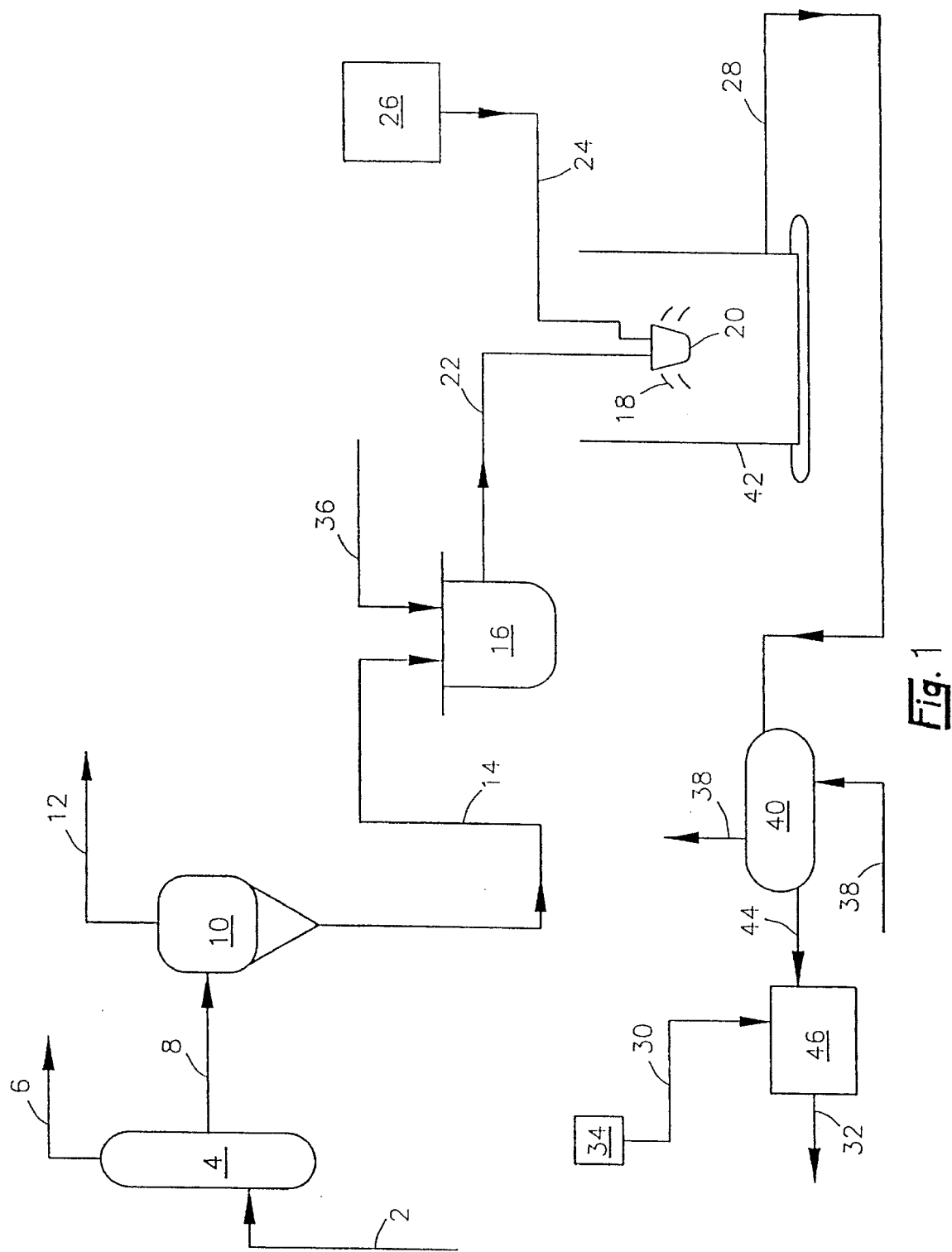
FIG. 1 is a simplified flow diagram illustrating a preferred embodiment of the process of the invention.

An important characteristic of the ammonium nitrate prill of this invention is its capacity to absorb oil or fuel. The high density ammonium nitrate prill of this invention surprisingly has the capacity to absorb five to ten times as much oil or fuel as compared to known high density ammonium nitrate prill. The oil absorbance characteristic of the ammonium nitrate prill of the invention is totally unexpected particularly for prills made from ammonium nitrate having an ammonium nitrate concentration of greater than about 99.5 wt. % and containing less than 0.5 wt. % water, and most preferably less than about 0.2 wt. % water.

A further important feature of the invention is the use of a minor porosity increasing amount of an aqueous based surfactant, preferably an alkylaryl sulfonate as an internal additive. For purposes of this invention, "porosity increasing amount" means from about 200 to about 1000 ppm, preferably from about 300 to about 800 ppm, and most preferably from about 500 to about 600 ppm based on the amount of active ingredient in the surfactant.

In a particularly preferred embodiment, the ammonium nitrate prill of the invention also contains an external coating of a non-aqueous surfactant, preferably a non-aqueous anionic alkylaryl sulfonate. The amount of external coating is preferably from about 200 to about 1500 ppm, more preferably from about 300 to about 1000 ppm and most preferably from about 500 to about 800 ppm based on the amount of active ingredient in the surfactant.

The ammonium nitrate prill exhibits a superior color as compared to prior coated ammonium nitrate prills. Rather than having a brownish tint as is the case with conventional high density prill made with clay additives, the prill of the invention has a white color. Accordingly, the whiter high density prill is more commercially acceptable, particularly for fertilizer uses.

Another additional important characteristic of the high density ammonium nitrate prill of the invention is its dimensional stability and resistance to dust or fines formation during production, storage and handling. Because of its stability, the high density ammonium nitrate prill of the invention has less tendency to form hard solid cakes during storage, which is particularly beneficial in fertilizer applications. Accordingly, the amount of recycled fines during production of the high density prill is lower than the amount of recycled material obtained when forming low density prill. A recycle rate of less than about 10 wt. % may be achieved by the invention, as compared to a recycle rate of 10 to 15 wt. % typically observed for conventional low density prill.

Representative surfactants useful in the practice of the invention include the sodium salt of 2-n-butylbenzenesulfonic acid; the sodium salt of 3-tert-dodecylbenzenesulfonic acid; the sodium salt of 4-n-eicosylbenzenesulfonic acid; the potassium salt of 4,-n-tetradecylbenzenesulfonic acid; the lithium salt of 4-tetracosylbenzenesulfonic acid; the disodium salt of 6-n-decylbenzene-p-disulfonic acid; the disodium salt of dimethylnaphthalene-1,2-disulfonic acid; the trirubidium salt of 5-tert-hexadecylbenzene-2,4,6-trisulfonic acid; the sodium salts of methylnaphthalenesulfonic acid, such as the sodium salts of 1-methylnaphthalene-2-sulfonic acid, 1-methylnaphthalene-4-sulfonic acid, and mixtures thereof; the sodium salt of 6-n-eicosylnaphthalene-1-sulfonic acid; the trisodium salt of 6,7,8-triethylnaphthalene-1,2,3-trisulfonic acid; the dicesium salt of 2,5-dimethylbenzene-1,3-disulfonic acid; the disodium salt of 4,6-di-n-decylnapththalene-1,8-disulfonic acid; the potassium salt of 7-tert-dodecylnaphthalene-2-sulfonic acid; the sodium salt of 2,5-dimethylbenzenesulfonic acid; and the like, including mixtures thereof. Of the above, the aqueous mixture of polycondensed and alkyl benzene sulfonic acid sodium salts sold by Lobeco Products, Inc. under the trade name GALORYL AT725 is particularly preferred as an internal additive and the mineral oil based mixture of alkyl naphthalene sulfonate sodium salts sold by Lobeco Products, Inc. under the trade name GALORYL ATH626M is particularly preferred as an external coating.

The surfactants for use in the invention are essentially inert with respect to the ammonium nitrate. For the internal additive, the surfactant is typically added to the molten concentrated ammonium nitrate during the prilling operation. After the prills are formed and cooled, the prills are preferably coated with the oil-based surfactant by well known coating techniques such as spraying while the prills are tumbled.

A simplified process flow diagram for forming the high density prill of the invention is illustrated in FIG. 1. In FIG. 1, water 6 is removed from an ammonium nitrate solution 2 in a multi-effect evaporator 4 to provide ammonium nitrate 8 having a concentration of about 94 to about 96 wt. %. The ammonium nitrate 8 is further concentrated to greater than about 99.5 wt. % ammonium nitrate at a temperature within the range of from about 320° to about 380° F. in concentrator 10 wherein additional water 12 is removed. The concentrated ammonium nitrate 14 is then fed to a head tank 16 which overflows to a foraminous prilling bucket 20 in a prilling tower 42. Preferably, the temperature of the feed to the bucket 20 is maintained in the range of from about 320° F. to 380° F., and most preferably from about 340° F. to about 360° F. Recycle ammonium nitrate 36 may also be fed to the head tank 16 to maintain a sufficient level of molten ammonium nitrate for feed to the prilling bucket 20. The prilling bucket 20 rotating at a speed within the range of from about 200 to about 250 rpm contains from about 0.032 to about 0.038 inch diameter holes for creating droplets 18 of molten ammonium nitrate.

As the concentrated molten ammonium nitrate 22 is fed to the prilling bucket 20, a liquid level of ammonium nitrate in the prilling bucket is established and maintained. An internal surfactant additive 24 from surfactant storage vessel 26 is preferably added to the ammonium nitrate in the prilling bucket 20 below the liquid level of ammonium nitrate in the bucket through a dip tube that extends below the liquid level more than one inch up to about twelve inches. It is particularly preferred to add the surfactant 24 to the ammonium nitrate concentrate 22 through a dip tube that extends from about eight to about ten inches below the liquid surface of ammonium nitrate.

It is also preferred to heat the surfactant 24 to a temperature within the range of from about 150° to about 200° F. (about 65° to about 93° C.) prior to adding it to the ammonium nitrate 22 in the prilling bucket 20. Heating the surfactant may be achieved by any number of well known ways, however, it is particularly useful to heat trace the conduit from the surfactant storage vessel to the dip tube extending into the prilling bucket.

In the prilling tower 42, the liquid droplets 18 emanating from the prilling bucket 20 fall through a distance of about 140 to about 150 feet from the upper portion of the prilling tower to the lower portion of the tower and cool sufficiently to form solid spherical prills having a diameter in the range of from about 1.8 to about 2.0 mm in diameter. The formed prills 28 are then collected in the bottom portion of the tower 42 and are fed to cooler 40 for further cooling. Prill cooler 40 utilizes air 38 to further cool the prills to about 75° to 85° F. before the coating step. The cooled prills 44 are then fed to a coating vessel 46 such as a rotating kiln equipped with overhead sprayers wherein an external surfactant coating 30 from surfactant storage vessel 34 is applied uniformly to the cooled prills to form the high density prill 32 of the invention.

Figure 2:
FIG. 2 is a photomicrograph of a cross section of a high density prill containing a clay internal additive.

Utilizing the process of the invention, porous high density prills are formed. These prills have unique porosity and surface characteristics. In order to further illustrate the unique characteristics of the ammonium nitrate prill of the invention, reference is made to FIGS. 2–5. FIG. 2 is a 40X magnification of a cross sectional view of a conventional high density prill containing a clay internal additive. As can be seen, the conventional high density prill has few, if any, pores for oil absorption.

Figure 3:
FIG. 3 is a photomicrograph of a cross section of a low density prill containing a surfactant internal additive and a surfactant coating.

FIG. 3 is a 50X magnification of a cross sectional view, of a low density prill which contains 500 to 550 ppm of GALORYL AT725 internal additive and 700 to 750 ppm of GALORYL ATH626M external coating The prill has a bulk density of about 40–51 lbs/ft$^3$.

Figure 4:
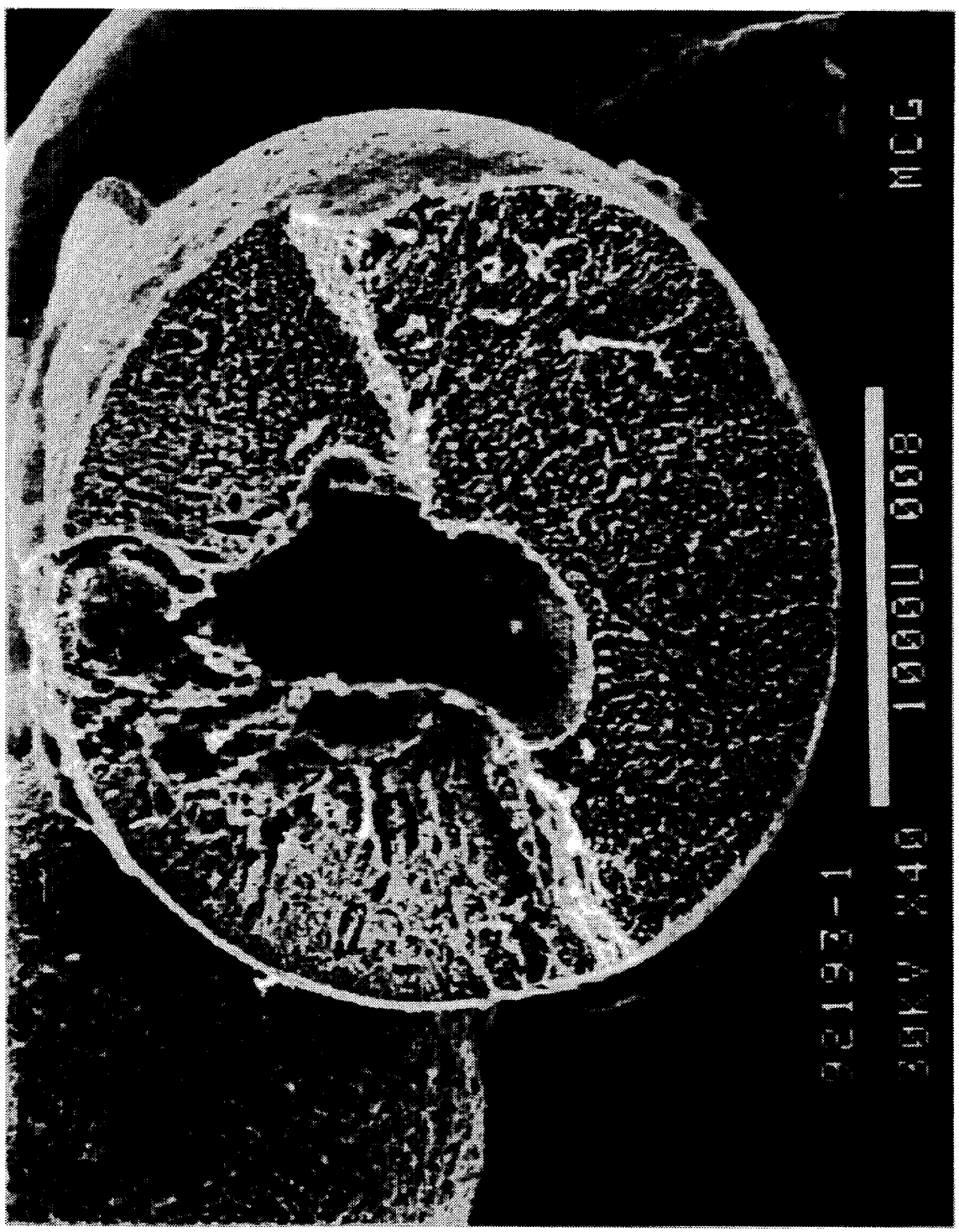
FIG. 4 is a photomicrograph of a cross section of a the high density prill according to the invention.
Figure 5:
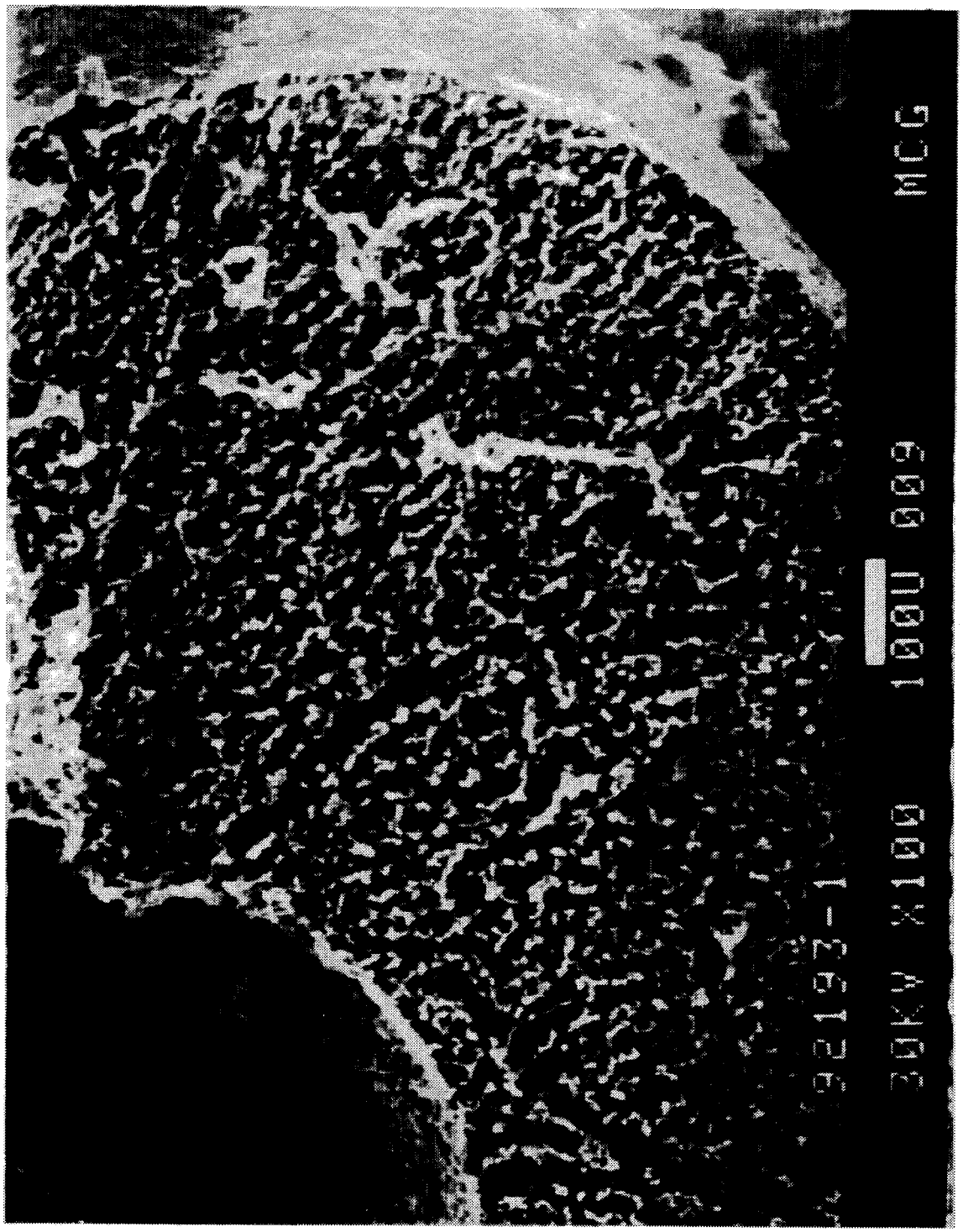
FIG. 5 is a magnified cross sectional portion of the high density prill of FIG. 4.

For comparison, FIGS. 4 and 5 show cross sectional views of a high density prill according to the invention containing 500 to 600 ppm of GALORYL AT725 internal additive and 500 to 700 ppm of GALORYL ATH626M external coating. FIG. 4 is a cross sectional view magnified 40X and FIG. 5 is a portion of the same cross sectional view magnified 100X. As compared to the low density prill (FIG. 3), the surface of the high density prill is smoother and more rounded and the pores are smaller and much more regular in distribution and size. The pore matrix of the invention is believed to contribute to the improved dimensional stability of the prill, and the dramatically improved oil absorption as compared with conventional high density prill.

As illustrated in FIG. 4, the high density prill of the invention is essentially spherical in shape and has a porous surface. While a low density prill (FIG. 3) containing the same internal additive and external coating may also have a porous surface, as compared to a low density prill, the pores in the surface of the high density prill are substantially more uniform in size and distribution.

To use the ammonium nitrate prill of the invention in an explosive composition it is necessary that the prills be mixed with a suitable fuel. Materials such as carbon black, sawdust and oat hulls may be employed, but a liquid oleaginous fuel such as diesel oil or fuel oil, gasoline, kerosene and the like permits a more intimate mixture and is preferred. Other useful fuels include lubricating oils, tallow oils, paraffin oils, low melting petroleum greases and waxes and partially nitrated derivatives of benzene, toluene, xylene and naphthalene. The fuel may be mixed with the ammonium nitrate prills using any suitable equipment such as a rotary mixer.

The amount of fuel mixed with ammonium nitrate prills to form an explosive is preferably an amount sufficient to exactly utilize the oxygen liberated by the decomposition of the nitrate. With the usual hydrocarbon oils, the amount of oil required is typically between about 4% and about 8% by weight based on the total weight of ammonium nitrate and fuel. If an amount of fuel either appreciably above or below the theoretically optimum amount is employed, the explosion efficiency of the composition may be reduced and an efficient explosion may not be obtained. Accordingly, the amount of fuel absorbed by the ammonium nitrate prills should be more than about 3% and no more than about 15% based on the total weight of ammonium nitrate and fuel.

Explosive compositions prepared in accordance with the invention may be conventionally employed. Normally the mixture of fuel and ammonium nitrate is simply poured into a borehole, primed, fused and stemmed in the usual manner. If used in wet or water filled boreholes, the ammonium nitrate mixture is preferably packed in waterproof containers or the like to prevent moisture adsorption. Waterproof containers of a high density product prepared in accordance with the invention normally sink when placed in a water filled borehole. The explosive compositions of the invention may contain other conventional ingredients such as emulsifiers, density reducing agents and the like.

An advantage of the process of the invention is the simplified process steps required to form the high density prills. Because of the very low initial moisture content of the molten ammonium nitrate used to form the high density prills, there is no need for extensive drying of the high density prills after the prilling tower. In stark contrast, a predryer and dryer are typically used before the product cooler for low density ammonium nitrate prills.

Another advantage of the process and compositions of the invention is the resulting high strength and dimensional stability of the prill, and the low recycle rate of the product. To determine the mechanical and thermal fracture strength of the high density product the following pan friability and prill degradation tests were used.

Pan Friability

A sample (about 100 grams) are sieved in a Fritsch sieve shaker using #8 and #10 Tyler screens. From the portion retained on the #10 screen, 50 grams of sample are transferred to a pan. Next forty 0.375 inch (0.925 cm) steel balls are added to the pan and the pan is placed on a Fritsch shaker for 10 minutes at 1 mm amplitude. The contents of the pan are then transferred to another pan using a #20 screen and a #6 screen while removing the steel balls. The sample retained on the #20 screen and the pan are then placed in a Fritsch shaker for two minutes. At the end of the two minute period, the pan is weighed and pan friability is determined by the formula:

$$\text{pan friability (wt. \%)} = \frac{50 \text{ grams} - \text{weight in pan} \times 100}{50 \text{ grams}}$$

The higher the pan friability, the higher the mechanical strength of the resulting prill.

Thermal Stability Prill Degradation Test

A sample of high density prill (about 100 cubic cm) is screened using #8 and #10 Tyler mesh screens. The screened sample (50 cubic cm) of −8+10 prills is placed in a 100 ml graduated cylinder that is sealed with a rubber stopper. The sample is then placed in an oven at 145° F. (63° C.) and cycled between 15 minutes with heat on and a blower off at 145° F. and 225 minutes with heat off and blower on at 80° F. (27° C.). These four hour cycles give six cycles per day. The thermal cycling is conducted for 7 days. The increase in volume of the sample and the percent degradation are visually determined and the results recorded. The higher the number of cycles and the lower the volume increase, the greater the thermal shock resistance of the prill.

The following table illustrates the characteristics of the high density prills of the invention in comparison to low density prills and conventional high density prills containing clay additives. In the table, sample 1 and 2 are low density ammonium nitrate prills and samples 3 and 4 are high density ammonium nitrate prills. The internal additive of sample 1 is $Al_2(SO_4)_3$, of sample 2 is GALORYL AT725, of sample 3 is clay and of sample 4 is GALORYL AT725.

TABLE

|  | Sample 1 | Sample 2 | Sample 3 | Sample 4 |
| --- | --- | --- | --- | --- |
| Recycle (wt. %) | 30–40 | 12–14 | 5 | 5 |
| Thermal Stability (cycles) | 20–25 | 40–50 | >50 | 40–50 |
| Nitrogen (wt. %) | 34.0 | 34.5 | 33.5 | 34.8 |
| Bulk Density (lbs/ft$^3$) | 47–49 | 49–51 | 58–60 | 56–58 |
| Concentration at top of tower (wt. %) | 95.0–96.0 | 97.0–98.0 | 99.7–99.8 | 99.7–99.9 |
| Temp. of concentrate feed (°F.) | 290–305 | 315–325 | 350–360 | 350–360 |
| Moisture at bottom of tower (wt. %) | 3.2–3.5 | 2.2–2.5 | 0.2–0.3 | 0.1–0.2 |
| Active Additive | 1000 (ppm) | 500–600 (ppm) | 2.5–3.0 (%) | 500–600 (ppm) |
| Vacuum in Tower (in. of Hg) | 21–22 | 21–22 | 28 | 28 |
| Friability (wt. %) | 50–70 | 80–90 | 99–100 | 90–95 |
| Oil Absorption (wt. %) | 6–7 | 10–12 | 1–2 | 8–9 |

As disclosed above, the high density prill of the invention may also be used for fertilizer applications. Hence, it may be desirable to reduce the explosive characteristics of the high density prill made by the process of the invention. Various additives may be added to the ammonium nitrate in addition to the sulfonate additives during the prilling process in order to reduce the explosive potential of the resulting high density prills.

Having thus described the invention and its preferred embodiments, it will be recognized that variations of the invention are within the spirit and scope of the appended claims.

What is claimed:

1. A method for forming a high density ammonium nitrate prill having improved oil absorption capacity comprising:

evaporating water from an ammonium nitrate solution to obtain an ammonium nitrate concentrate containing less than 0.5 wt. % water and at least about 99.5 wt. % ammonium nitrate;

adding to the ammonium nitrate concentrate an internal additive containing an aqueous naphthalene sulfonate to provide an ammonium nitrate mixture;

forming droplets of the ammonium nitrate mixture in a prilling tower having an upper section and a lower section; and cooling said droplets by downward flow of the droplets through the tower from the upper section to the lower section countercurrent to an upward flow of a cooling gas so that the droplets solidify to form a high density ammonium nitrate prill having an oil absorption capacity of greater than about 4 wt. %.

2. The method of claim 1 further comprising externally coating the formed high density ammonium nitrate prill with from about 500 to about 800 ppm of a non-aqueous anionic alkylaryl sulfonate.

3. The method of claim 2 wherein the alkylaryl sulfonate is naphthalene sulfonate.

4. The method of claim 1 wherein the internal additive contains from about 500 to about 600 ppm of the aqueous naphthalene sulfonate.

5. The method of claim 1 wherein the step of forming droplets comprises feeding the ammonium nitrate concentrate to a rotating foraminous prilling bucket and adding the naphthalene sulfonate to the ammonium nitrate concentrate in the prilling bucket to form the ammonium nitrate mixture, wherein the naphthalene sulfonate is added through a dip tube that extends more than one inch up to about 12 inches below a liquid level of ammonium nitrate concentrate in the prilling bucket.

6. The method of claim 5 wherein the ammonium nitrate mixture in the prilling bucket is maintained at a temperature within the range of from about 340° F. to about 360° F. (about 171° C. to about 182° C.).

7. The method of claim 1 wherein the ammonium nitrate mixture is maintained at a temperature within the range of from about 340° F. to about 360° F. (about 171° C. to about 182° C.) prior to forming the droplets.

8. A process for making a high density ammonium nitrate prill comprising:

evaporating water from an ammonium nitrate solution to obtain an ammonium nitrate concentrate containing less than 0.5 wt. % water and at least about 99.5 wt. % ammonium nitrate;

adding to the ammonium nitrate concentrate an internal additive containing an aqueous naphthalene sulfonate to provide an ammonium nitrate mixture;

forming droplets of the ammonium nitrate mixture in a prilling tower having an upper section and a lower section; and cooling said droplets by downward flow of the droplets through the tower from the upper section to the lower section countercurrent to an upward flow of a cooling gas so that the droplets solidify to form a high density ammonium nitrate prill having a density of at least 54 pounds per cubic foot (0.86 kg/L).

9. The process of claim 8 further comprising externally coating the formed high density ammonium nitrate prill with from about 500 to about 800 ppm of an anionic alkylaryl sulfonate.

10. The process of claim 9 wherein the alkylaryl sulfonate is naphthalene sulfonate.

11. The process of claim 8 wherein the step of forming droplets comprises feeding the ammonium nitrate concentrate to a rotating foraminous prilling bucket and adding the naphthalene sulfonate to the ammonium nitrate concentrate in the prilling bucket to form the ammonium nitrate mixture, wherein the naphthalene sulfonate is added through a dip tube that extends more than one inch up to about 12 inches below a liquid level of ammonium nitrate concentrate in the prilling bucket.

12. The process of claim 11 wherein the ammonium nitrate mixture in the prilling bucket is maintained at a temperature within the range of from about 340° F. to about 360° F. (about 171° C. to about 182° C.).

13. The process of claim 8 wherein the internal additive contains from about 500 to about 600 ppm of the aqueous naphthalene sulfonate.

14. The process of claim 8 wherein the ammonium nitrate mixture is maintained at a temperature within the range of from about 340° F. to about 360° F. (about 171° C. to about 182° C.) prior to forming the droplets.

* * * * *